(12) United States Patent
Chuang

(10) Patent No.: US 7,817,415 B2
(45) Date of Patent: Oct. 19, 2010

(54) HEIGHT ADJUSTMENT MECHANISM

(75) Inventor: Cheng-Hsiang Chuang, Taipei (TW)

(73) Assignee: Inventec Corporation, Taipei (TW)

( * ) Notice: Subject to any disclaimer, the term of this patent is extended or adjusted under 35 U.S.C. 154(b) by 916 days.

(21) Appl. No.: 11/707,512

(22) Filed: Feb. 16, 2007

(65) Prior Publication Data

US 2008/0198505 A1   Aug. 21, 2008

(51) Int. Cl.
G06F 1/16 (2006.01)
(52) U.S. Cl. .............. 361/679.43; 361/679.41; 361/679.58; 710/303; 710/304
(58) Field of Classification Search ............ 361/679.44, 361/679.59
See application file for complete search history.

(56) References Cited

U.S. PATENT DOCUMENTS

| 3,155,362 | A | * | 11/1964 | McCall ................... 248/688 |
| 4,141,523 | A | * | 2/1979 | Brendgens ................ 248/653 |
| 4,592,528 | A | * | 6/1986 | Still ..................... 248/682 |
| 4,856,748 | A | * | 8/1989 | Obermeyer ............... 248/688 |
| 5,019,465 | A | * | 5/1991 | Herron et al. ............. 429/97 |
| 5,436,792 | A | * | 7/1995 | Leman et al. ........... 361/679.44 |
| 5,503,361 | A | * | 4/1996 | Kan-O et al. ............. 248/688 |
| 5,542,152 | A | * | 8/1996 | Crompton et al. .......... 16/354 |
| 5,627,450 | A | * | 5/1997 | Ryan et al. ............ 361/679.44 |
| 5,657,956 | A | * | 8/1997 | Smith et al. ............. 248/371 |
| 5,771,152 | A | * | 6/1998 | Crompton et al. ....... 361/679.27 |
| 5,799,372 | A | * | 9/1998 | Brunner et al. ............ 16/342 |
| 6,097,592 | A | * | 8/2000 | Seo et al. ............. 361/679.55 |
| 6,098,952 | A | * | 8/2000 | Tonn ..................... 248/688 |
| 6,151,218 | A | * | 11/2000 | Pirdy et al. .............. 361/727 |
| 6,152,414 | A | * | 11/2000 | Jondrow ............... 248/346.03 |
| 6,474,614 | B2 | * | 11/2002 | MacEachern ............ 248/349.1 |
| 6,583,985 | B2 | * | 6/2003 | Nguyen et al. ......... 361/679.27 |
| 6,654,237 | B1 | * | 11/2003 | Lee .................... 361/679.55 |
| 6,663,064 | B1 | * | 12/2003 | Minelli et al. ........... 248/205.5 |
| 7,035,100 | B2 | * | 4/2006 | Lord ................... 361/679.41 |
| 7,079,383 | B2 | * | 7/2006 | Homer ................. 361/679.35 |
| 7,280,854 | B2 | * | 10/2007 | Sugawara et al. ....... 455/575.1 |
| 7,381,079 | B2 | * | 6/2008 | Chuang .................. 439/352 |
| 7,612,993 | B1 | * | 11/2009 | Takei et al. ........... 361/679.31 |
| 2003/0076018 | A1 | * | 4/2003 | Helot et al. ............. 312/223.2 |

(Continued)

FOREIGN PATENT DOCUMENTS

TW          452107         12/1988

Primary Examiner—Jayprakash N Gandhi
Assistant Examiner—Anthony Q Edwards
(74) Attorney, Agent, or Firm—Tim Tingkang Xia; Morris, Manning & Martin, LLP

(57) ABSTRACT

A height adjustment mechanism disposed in a body is provided, which includes two axle seats disposed on the body, a spindle, two support parts fixed on the spindle, and a stop component. Each of the support parts has a fitting hole, and the spindle is rotatably disposed in the body, and drives the support parts to rotate simultaneously, the spindle has a positioning part having a plurality of grooves, and each of the two support parts has a plurality of asymmetric end surfaces. Any one of the end surfaces is selectively pressed against a plane, such that different height differences exist between the body and the plane. The stop component is corresponding to the positioning part, and is movably disposed in the body, and the stop component moves between a stop position that is clamped in the grooves and a release position where the spindle is allowed to rotate freely.

12 Claims, 4 Drawing Sheets

U.S. PATENT DOCUMENTS

2003/0147209 A1* 8/2003 Oross et al. ................. 361/686
2005/0287852 A1* 12/2005 Sugawara et al. ........... 439/135
2008/0137285 A1* 6/2008 Chuang ...................... 361/686

* cited by examiner

HEIGHT ADJUSTMENT MECHANISM

BACKGROUND OF THE INVENTION

1. Field of Invention

The present invention relates to a height adjustment mechanism, and more particularly to a height adjustment mechanism in which one of asymmetric end surfaces is selectively pressed against a plane to obtain different height differences.

2. Related Art

With the rapid development of modern science and technology, electronic devices have become an indispensable product in both work and life, and electronic products are developing in the trend of being light, thin, short, and small. Currently, commercially available portable electronic devices, such as notebooks, are becoming smaller and smaller, which are more convenient to carry for users who travels frequently, thereby improving the convenience in use substantially.

Light and thin notebooks limited by its size and volume cannot provide complete function as personal computers do. Therefore, docking stations for providing expanded functions are required to allow the notebooks to have the same functions of the personal computers. Expansion slots of a conventional docking station are located at fixed positions, and can be connected with a notebook having a mated docking station successfully. However, if a notebook of a different model is intended to be connected with the docking station, the heights of the connection ports of the two are different, so that the notebook and the docking station cannot be connected. Therefore, the user should purchase different docking stations for different models of notebooks, which is not only inconvenient to users, but also a waste of resources and is not economical as the users should pay for multiple sets of docking stations with the same function.

In order to solve the aforementioned problems, Taiwan Patent No. 452107 published on 21 Aug. 2001 disclosed "External Docking Station with Variable Height for Guiding Portable Computer", which disposes a carrier board on a body of the docking station for placing a notebook. An adjustment member capable of protruding out of or retracting into an upper surface of the carrier board is disposed on the carrier board, and a height variation mechanism connected with the adjustment member is disposed in the body, such that the adjustment member rises or falls with respect to the upper surface of the carrier board, so as to adjust the notebook placed on the body of the docking station to an appropriate height. Thus, the connectors of the notebook and the body can be connected correspondingly.

However, the external docking station with variable heights disclosed in Taiwan Patent No. 452107 has a complicated structure that is used to make the carrier board rise or fall. And, it is time consuming to assemble the complicated parts and components of the height variation mechanism during manufacturing, so the manufacturing efficiency is lowered. Moreover, Patent No. 452107 does not include a component to fix the height variation mechanism at a certain height. Therefore, when the notebook is placed on the carrier board, it is likely that the carrier board without the component to fix the height variation mechanism at a certain height cannot bear the weight of the notebook and slides, which is even more inconvenient to users.

SUMMARY OF THE INVENTION

In view of the aforementioned problem, the present invention provides a height adjustment mechanism, so as to solve the problem that the docking station of the prior art cannot be adjusted to an appropriate height corresponding to the notebook, and eliminates the limitation or disadvantages of the complex assembly of the height variation mechanism.

The height adjustment mechanism disclosed in the present invention is disposed in a body and comprises at least one axle seat disposed on the body, a spindle, at least one support part having a fitting hole, and a stop component. The spindle is rotatably disposed in the body and is fitted in the fitting hole, so as to drive the support part to rotate simultaneously. The spindle comprises a positioning part having a plurality of grooves. The support part is disposed in the axle seat and has a plurality of asymmetric end surfaces. Any one of the end surfaces is selectively pressed against a plane, such that different height differences exist between the body and the plane. The stop component is corresponding to the positioning part on the spindle and is movably disposed in the body. And, the stop component moves between a stop position where the stop component is clamped in the grooves and a release position where the stop component moves out of the grooves and the spindle is allowed to rotate freely.

The efficacy of the present invention is that any one of the asymmetric end surfaces is selectively pressed against a plane, such that different height differences exist between the body and the plane. Thus, the height of the body does can be adjusted without using a height variation mechanism composed of complicated parts and components, thereby achieving the purpose of simplifying the parts and components of the height adjustment mechanism and reducing the manufacturing cost.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The height adjustment mechanism of the present invention is applied in an electronic device that can be a notebook, a PDA, or a tablet PC, but not limit to the above-mentioned electronic devices. In the detailed description of the present invention below, the notebook computer is taken as a preferred embodiment of the present invention. However, the accompanying drawing is used for reference and illustration only, and is not intended to limit the present invention.

Figure 1:
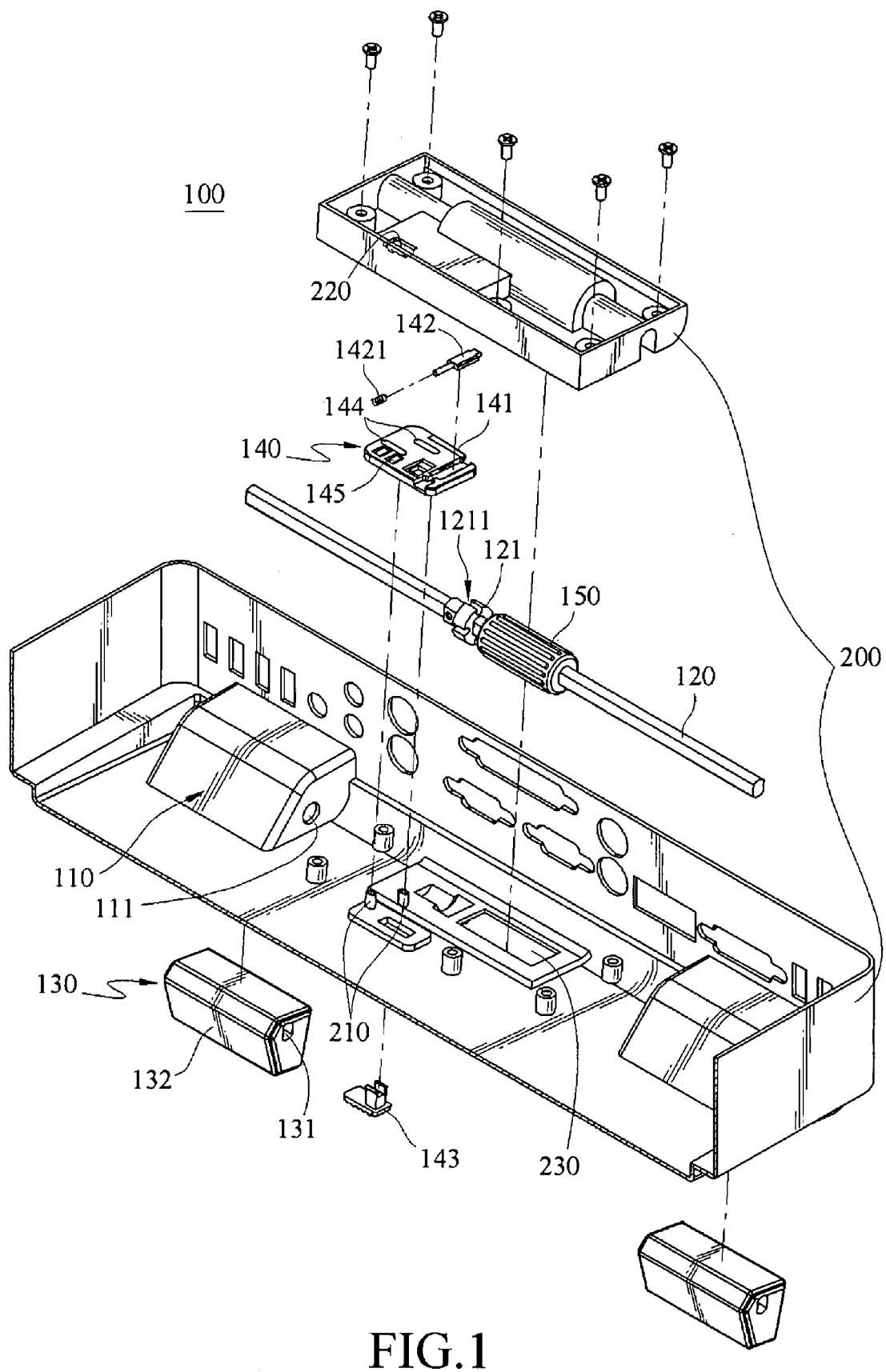
FIG. 1 is an exploded schematic view of the present invention.
Figure 2:
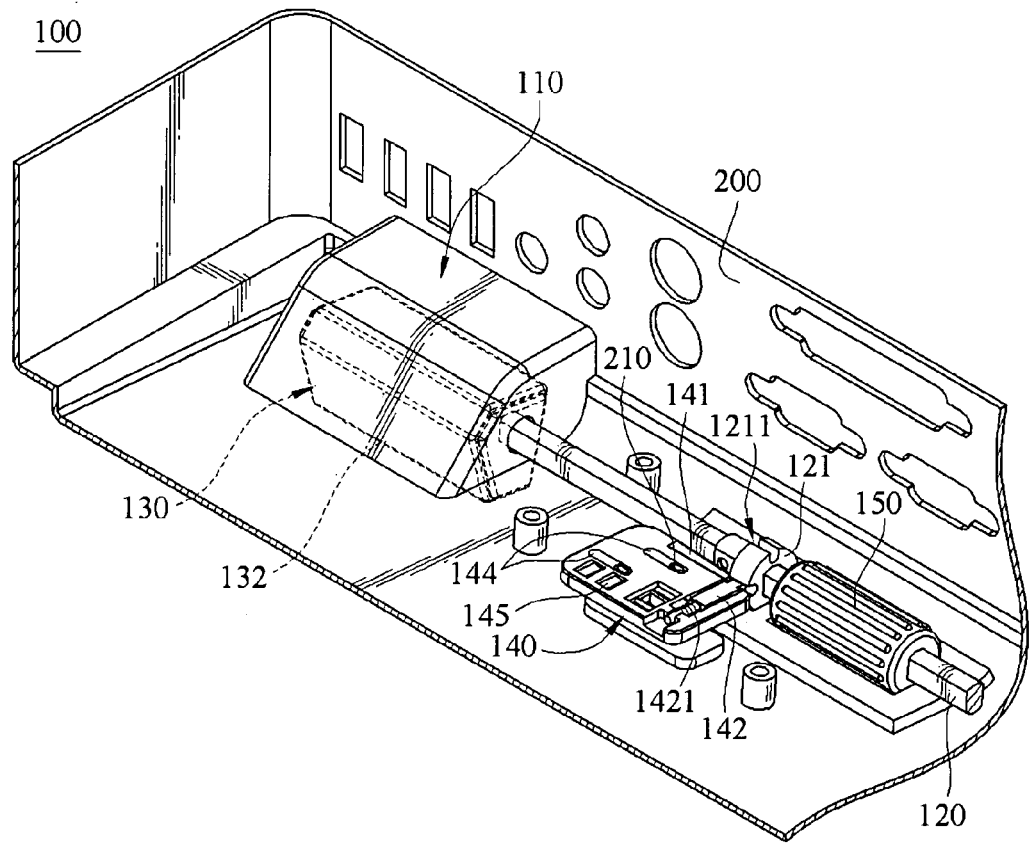
FIG. 2 is a schematic isometric view of the present invention.
Figure 3:
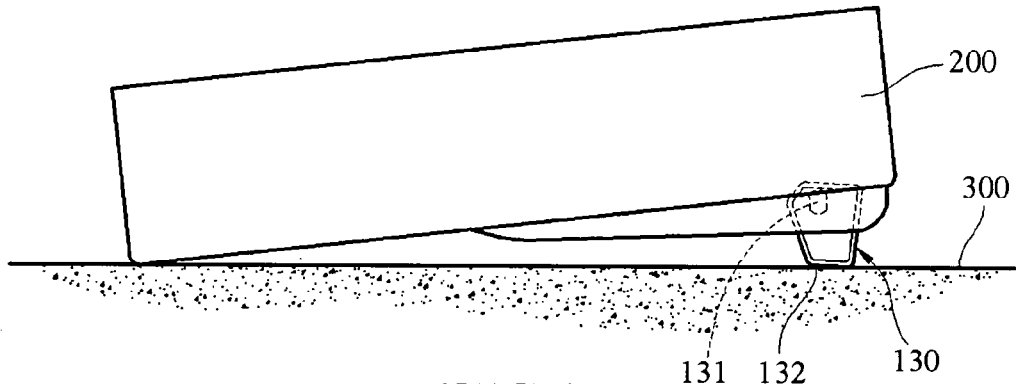
FIG. 3 is a schematic side view of the height adjustment mechanism of the present invention when placed on the plane.

As shown in FIG. 1, FIG. 2, and FIG. 3, the height adjustment mechanism 100 disclosed in the present invention is disposed in a body 200. The height adjustment mechanism 100 includes two axle seats 110 disposed on the body 200, a spindle 120, two support parts 130, and a stop component 140. Each of the two axle seats 110 includes an accommodation space respectively, and an axle hole 111 is formed in each of two opposite sidewalls. The two support parts 130 respectively include a fitting hole 131 that off-center arranged on the support parts 130, the spindle 120 is rotatably disposed in the axles hole 111, and is fitted in the fitting holes 131, so as to drive the support parts 130 to rotate simultaneously. The spindle 120 has a cut section along the axial direction, and a positioning part 121 having a plurality of grooves 1211 is fitted on the cut section. Each of the two support parts 130 has a plurality of asymmetric end surfaces 132. When the spindle 120 rotates, one of the end surfaces 132 of the support parts 130 is selectively pressed against a plane 300. Here, the plane 300 in the present invention refers to a plane such as the table surface or the ground for placing the height adjustment mechanism 100 and the body 200 stably. Thus, height differences corresponding to different end surfaces 132 exist between the body 200 and the plane 300. The stop component 140 is corresponding to the positioning part 121 on the spindle 120, and is movably disposed in the body 200. The stop component 130 moves between a stop position where the stop component 130 is clamped in the grooves 1211 of the positioning part 121 and a release position where the stop component 130 moves out of the grooves 1211 and the spindle 120 is allowed to rotate freely.

Refer to FIG. 1 to FIG. 3, the height adjustment mechanism 100 of the present invention further includes a control member 150 fixed on the spindle 120 and protruding out of an opening 230 of the body 200. The control member 150 assists the rotation of the spindle 120, and drives the support part 130 to rotate simultaneously, so that one end surface 132 of the support part 130 is pressed against the plane 300, to conform with the actual requirements on height.

Figure 4A:
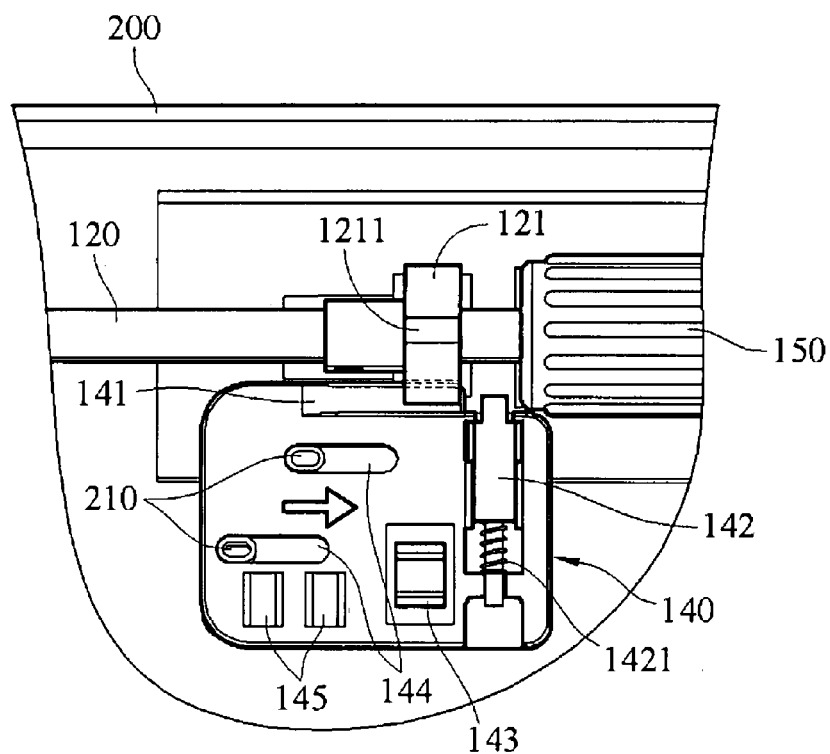
FIG. 4A is a schematic view of the state that the stop component of the present invention moves to the stop position.
Figure 4B:
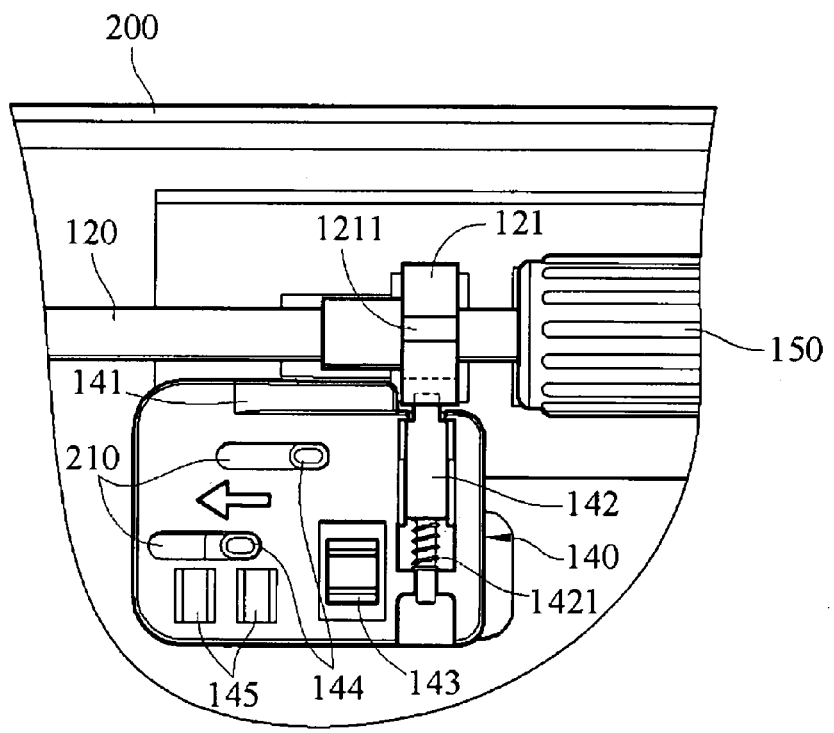
FIG. 4B is a schematic view of the state that the stop component of the present invention moves to the release position.

FIGS. 4A and 4B are schematic views of the states that the stop component of the present invention moves to the stop position and the release position respectively. As shown in the figures, the stop component 140 further includes a clamping part 141 disposed on one side corresponding to the positioning part 121 and a pin 142 adjacent to the clamping part 141. A spring 1421 capable of normally pushing the pin 142 is disposed on one end of the pin 142. When the stop component 140 moves to the stop position, the clamping part 141 of the stop component 140 is clamped in one of the grooves 1211 of the positioning part 121, so as to fix the spindle 120, such that the spindle 120 cannot rotate. When the stop component 140 moves to the release position, the pin 142 of the stop component 140 is movably embedded in one of the grooves 1211. The spring 1421 is normally pushed the pin 142. When the spindle 120 rotates, the pin 142 inserts to one of segments of the positioning part 121 and makes a knock sound to remind the user of the angle and position of the current adjustment.

Please refer to FIG. 1, FIG. 4A, and FIG. 4B, the stop component 140 further includes a movable part 143 protruding out of the body 200, such that the user can move the stop component 140 to the stop position or the release position. Moreover, the stop component 140 has at least one sliding slot 144, and the body 200 has a number of stop units 210 corresponding to the number of the sliding slots 144, such that the range that the stop component 140 is driven to move by the user with the movable part 143 is confined between the stop position and the release position.

Figure 5:
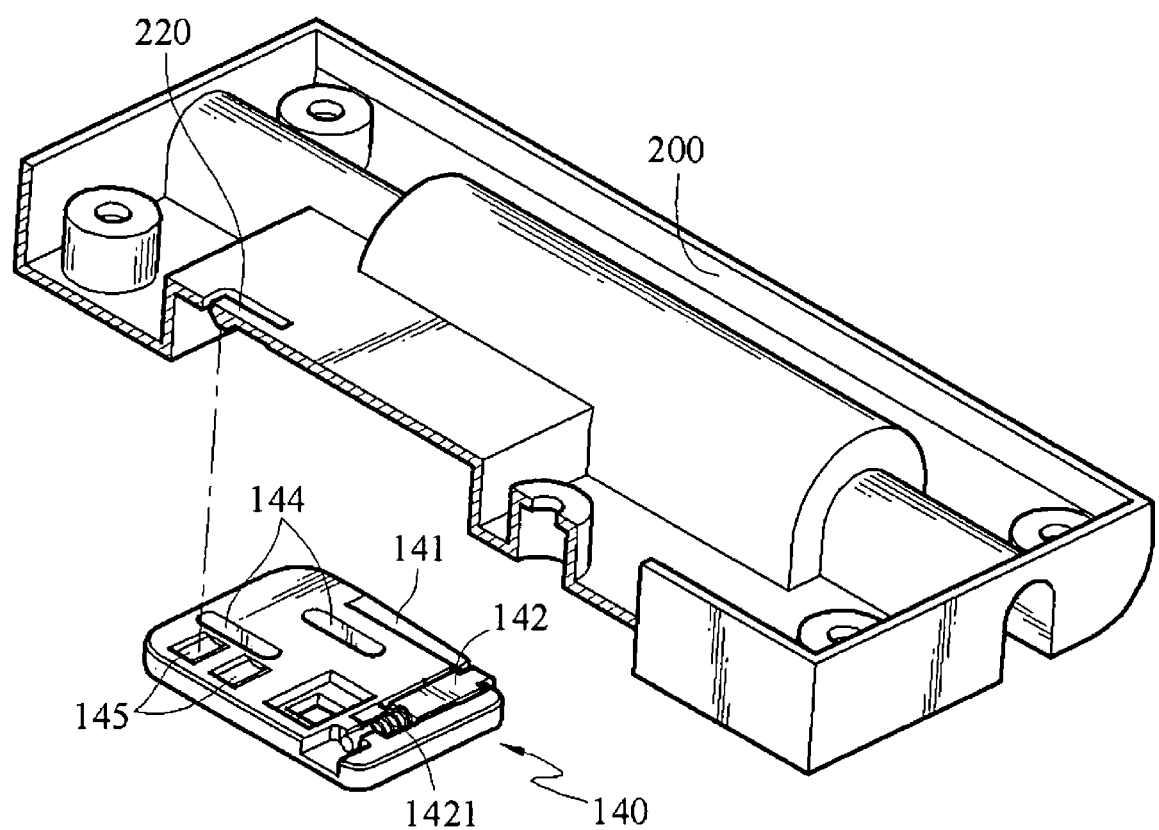
FIG. 5 is a schematic partial enlarged view of the present invention.

As shown in FIG. 5, two positioning parts 145 are recessed on the stop component 140 which corresponding to the stop position and the release position respectively, and an elastic blade 220 corresponding to the two positioning parts 145 is disposed on the body 200. When the stop component 140 moves to the stop position or the release position, the protruding end is clamped in the recesses of the positioning parts 145, so as to fix the stop component 140 at the stop position or the release position.

Compared with conventional docking stations, the height adjustment mechanism of the present invention selectively press any one of the asymmetric end surfaces against the plane according to actual requirements of the user, such that the corresponding height difference exists between the body and the plane. Therefore, the height can be adjusted corresponding to different models of notebooks without using the height variation mechanism composed of complicated parts and components. Thus, the structure of the height adjustment mechanism is simplified, and the manufacturing cost is reduced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A height adjustment mechanism disposed in a body, comprising:
    at least one axle seat disposed on the body;
    a spindle, rotatably fitted in the axle seat;
    a positioning part, fitted on the spindle and having a plurality of grooves;
    at least one support part disposed in the axle seat, wherein the support part has a fitting hole, and the spindle passes through the fitting hole, so as to rotate with the spindle simultaneously, and one of end surfaces is pressed against a plane, such that different height differences exist between the body and the plane; and
    a stop component, corresponding to the positioning part and movably disposed in the body, wherein the stop component moves between a stop position where the spindle is fixed and a release position where the spindle is allowed to rotate freely, wherein the stop component comprises a movable part for driving the stop component to move to the stop position and the release position.

2. The height adjustment mechanism as claimed in claim 1, wherein the axle seat has an axle hole for allowing the spindle to pass through to be disposed on the axle seat.

3. The height adjustment mechanism as claimed in claim 1, wherein the support part is a structure having a plurality of asymmetric end surfaces.

4. The height adjustment mechanism as claimed in claim 1, further comprising a control member fixed on the spindle for assisting to rotate the spindle, such that the support part supports the body and has different height differences with the plane.

5. The height adjustment mechanism as claimed in claim 1, wherein the stop component further comprises a clamping part and a pin, and the pin has a spring that is normally push the pin, when the stop component moves to the stop position, the clamping part is clamped in the groove to fix the spindle; when the stop component moves to the release position, the pin is movably embedded in the groove.

6. The height adjustment mechanism as claimed in claim 1, wherein the stop component further has at least a sliding slot, and the body has at least one stop unit corresponding to the sliding slot to confine a range that the movable part drives the stop component to move.

7. The height adjustment mechanism as claimed in claim 1, wherein the stop component further comprises two positioning parts, and the body comprises an elastic blade corresponding to the positioning parts, so as to fix the stop component at the stop position and the release position.

8. A computer docking station structure for providing a connection with a notebook computer, comprising:
- a body, having an opening arranged on one side thereof;
- two axle seats, disposed on the body, wherein each of the axle seats comprises an axle hole and an accommodation space;
- a spindle, rotatably fitted in the axle hole, wherein the spindle has a cut section, a positioning member and a control member are fitted on the spindle, the control member protrudes out of the opening and drives the spindle and the positioning member to rotate simultaneously, and the positioning member has a plurality of grooves;
- two support parts, disposed in the accommodation space, wherein the two support parts respectively have a fitting hole and a plurality of asymmetric end surfaces, and the spindle passes through the fitting hole, so as to rotate with the spindle, and any one of the end surfaces is selectively pressed against a plane, such that different height differences exist between the body and the plane; and
- a stop component, corresponding to the positioning part and movably disposed on the body, wherein the stop component moves between a stop position where the spindle is fixed and a release position where the spindle is allowed to rotate freely.

9. The computer docking station structure as claimed in claim 8, wherein the stop component further comprises a clamping part and a pin, and the pin has a spring that is normally pressed against the pin, when the stop component moves to the stop position, the clamping part is clamped in the groove to fix the spindle; when the stop component moves to the release position, the pin is movably embedded in the groove.

10. The computer docking station structure as claimed in claim 8, wherein the stop component comprises a movable part for driving the stop component to move to the stop position and the release position.

11. The computer docking station structure as claimed in claim 10, wherein the stop component further has at least one sliding slot, and the body has at least one stop unit corresponding to the sliding slot, so as to confine a range that the movable part drives the stop component to move.

12. The computer docking station structure as claimed in claim 10, wherein the stop component further comprises two positioning parts, and the body comprises an elastic blade corresponding to the positioning parts, so as to fix the stop component at the stop position and the release position.

* * * * *